Dec. 13, 1955  A. J. LEWUS  2,727,197
INDUCTION MOTORS OF THE CAPACITOR TYPE
Filed June 10, 1953
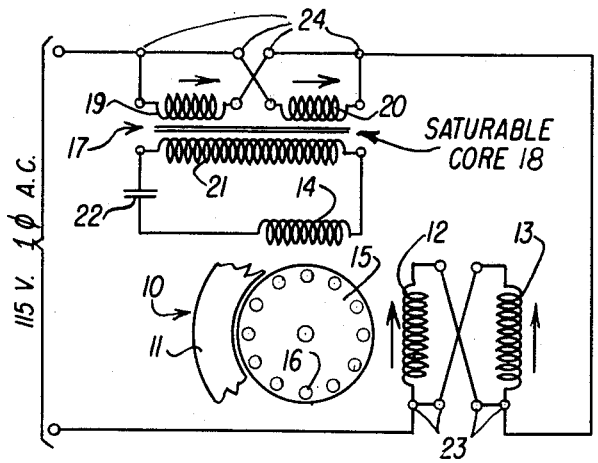
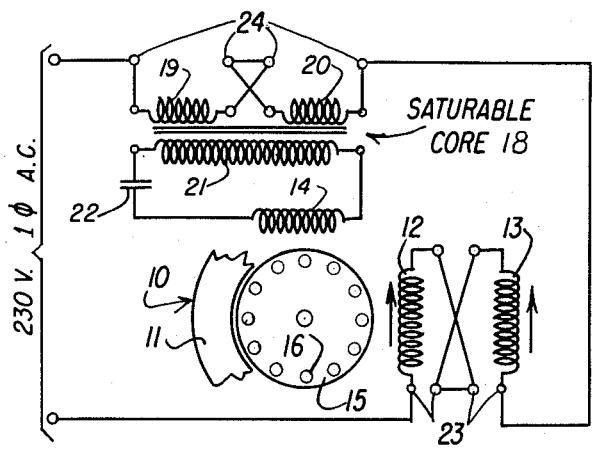
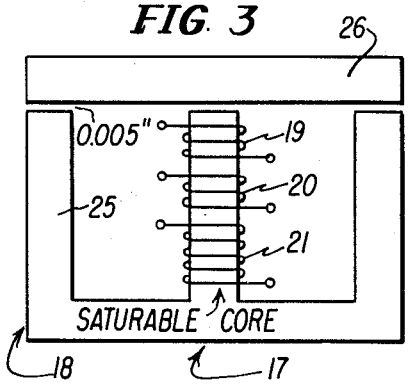
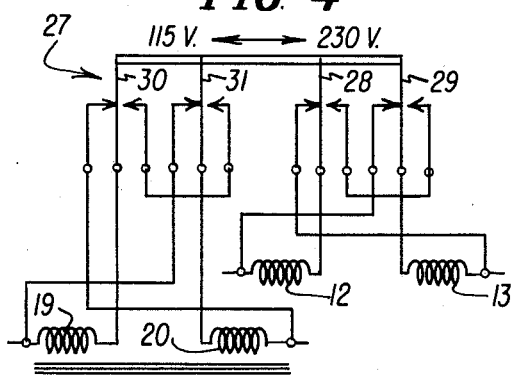
INVENTOR.
Alexander J. Lewus
BY
Smith, Olsen + Baird
Attys.

United States Patent Office 2,727,197
Patented Dec. 13, 1955

2,727,197

INDUCTION MOTORS OF THE CAPACITOR TYPE

Alexander J. Lewus, Cicero, Ill.

Application June 10, 1953, Serial No. 360,798

13 Claims. (Cl. 318—220)

The present invention relates to induction motors of the capacitor type and more particularly to improved starting and running circuits for such motors.

It is the general object of the present invention to provide in a single phase induction motor of the capacitor type, an improved and simplified starting and running circuit that develops a large starting torque in the motor and that does not require removal from the circuit of the associated capacitor during running of the motor.

Another object of the invention is to provide in an induction motor starting and running circuit of the character noted, an improved arrangement of a transformer having a saturable magnetic core and a capacitor of the dry electrolytic type, whereby the starting and running currents in the circuit are automatically controlled to insure quick starting of the motor and to prevent damage to the capacitor permanently connected in the circuit.

Further features of the invention pertain to the particular connection and arrangement of the elements of the electric motor and of the starting and running circuit therefor, whereby the above-outlined and additional operating features thereof are attained.

The invention, both as to its organization and method of operation, together with further objects and advantages thereof, will best be understood by reference to the following specification taken in connection with the accompanying drawing, in which:

Figure 1 is a schematic electric diagram of an induction motor of the capacitor type and of the starting and running circuit therefor arranged for low voltage operation, and embodying the present invention;

Fig. 2 is a schematic electric diagram of the motor and the starting and running circuit therefor arranged for high voltage operation;

Fig. 3 is a schematic diagram of the transformer incorporated in the starting and running circuit for the motor as illustrated in Figs. 1 and 2; and Fig. 4 is a schematic electric diagram of a switch arrangement that may be incorporated in the starting and running circuit for the motor so that the motor may be readily connected either for low voltage operation or for high voltage operation as respectively illustrated in Figs. 1 and 2.

Referring now to Fig. 1 of the drawing, there is illustrated an induction motor 10 of the dual operating voltage type and a starting and running circuit therefor adapting the same for low voltage operation, and embodying the features of the present invention. The motor 10 is also of the single-phase split-phase capacitor type including a stator 11 provided with angularly displaced main and auxiliary windings, the main winding including two sections respectively indicated at 12 and 13, and the auxiliary winding being indicated at 14, as well as a rotor 15 provided with a squirrel-cage winding 16 having either a high resistance or a low resistance, and preferably a low resistance. Preferably the main winding 12—13 and the auxiliary winding 14 are arranged in quadrature relation, the main winding sections 12 and 13 being connected in parallel relation with respect to each other for low voltage operation. Also the circuit comprises a transformer 17 including a saturable magnetic core 18 that may or may not include an air gap and that is provided with primary and secondary windings, the primary winding including two sections respectively indicated at 19 and 20, and the auxiliary winding being indicated at 21. The primary winding sections 19 and 20 are connected in parallel relation with respect to each other for low voltage operation. Further, the circuit includes a capacitor 22 of the paper or dry electrolytic type that may consist of one or more individual cells either of the polarized or non-polarized type. Finally, the circuit comprises a source of single-phase alternating current supply of low voltage that may be of a commercial source having a voltage of 115 volts and of a substantially sinusoidal wave form, as well as a master switch, not shown.

In the circuit arrangement, the parallel connected main winding sections 12 and 13 and the parallel connected primary winding sections 19 and 20 are connected in series circuit relation across the source of current supply; and the auxiliary winding 14, the secondary winding 21 and the capacitor 22 are connected in series circuit relation with each other. In the arrangement, the main winding 12—13 and the primary winding 19—20 constitute a primary circuit; and the auxiliary winding 14, the secondary winding 21 and the capacitor 22 constitute a secondary circuit.

The motor 10 may be of the fractional horespower type or may have a rating as high as about 10 H. P.; however in the illustrated embodiment the motor 10 has a rating of 1 H. P.; whereby each of the main winding sections 12 and 13 comprises 200 turns, the auxiliary winding 14 comprises 160 turns, each of the primary winding sections 19 and 20 comprises 42 turns, and the secondary winding 21 comprises 233 turns. Accordingly the starting and running impedances of the parallel connected main winding sections 12 and 13 are respectively low and high with respect to each other so that the magnetic core 18 is respectively saturated and unsaturated by the starting and running currents traversing the parallel connected primary winding sections 19 and 20; whereby the starting and running currents traversing the parallel connected primary winding sections 19 and 20 induce peaked starting and substantially sinusoidal running voltages in the secondary winding 21. The starting and running voltages induced in the secondary winding 21 are respectively high and low with respect to each other, and the starting and running impedances of the auxiliary winding 14 are respectively low and high with respect to each other, so that the starting and running currents traversing the auxiliary winding 14 are respectively high and low with respect to each other. The starting current traversing the parallel connected primary windings 19 and 20 maintain saturated the magnetic core 18 from stand-still to at least 50% of the normal running speed of the rotor 15, the rotor 15 having a normal running speed at full load of about 1735 R. P. M. and asynchronous speed of 1800 R. P. M.

More particularly, from stand-still to about 50% normal running speed of the motor 10, the rotor 15 develops at least 150% normal torque, the starting torque increasing rapidly from this speed to approximately 275% normal torque at 67% of the normal running speed thereof, and then decreasing gradually to 100% normal torque at the normal running speed thereof. The capacitor 22 has a relatively small capacitance (about 230 microfarad) and a relatively high voltage rating (about 200 volts). The secondary circuit including the auxiliary winding 14, the secondary winding 21 and the capacitor 22 is substantially series resonant during saturation of the magnetic core 18 so that the capacitor 22 effects substantial de-phasing of the starting current traversing the auxiliary winding 14 with respect to the starting current traversing the parallel connected main winding sections 12 and 13, in order to produce a substantial starting torque between the stator 11 and the rotor 15.

When the master switch, not shown, is closed, the rotor 15 of the motor 10 breaks-away and is rapidly accelerated to its full load running speed of 1735 R. P. M., whereby at this time the voltage induced in the auxiliary winding 14 from the main winding 12—13 is in opposition to the voltage induced in the secondary winding 21 from the primary winding 19—20; whereby there is substantially no resulting voltage in the secondary circuit so that the current traversing the capacitor 22 is exceedingly small. The following data obtained from the 1 H. P. embodiment of the motor 10 clearly illustrates the operating characteristics thereof with the low voltage connections:

Table I

| Characteristics | Starting Condition | Full Load Condition | No Load Condition |
| --- | --- | --- | --- |
| Line or primary circuit voltage | 115 | 115 | 115 |
| Line or primary circuit current (amps) | 38 | 12 | 7 |
| Primary winding voltage | 33 | 14 | 18 |
| Primary winding impedance (ohms) | 0.87 | 1.16 | .57 |
| Main winding voltage | 85 | 112 | 116 |
| Main winding impedance (ohms) | 2.23 | 9.33 | 16.57 |
| Secondary circuit current (amps) | 15.50 | 2.25 | 2.40 |
| Secondary winding voltage | 156 | 68 | 92 |
| Secondary winding impedance (ohms) | 10.06 | 30.22 | 38.33 |
| Capacitor voltage | 186 | 26 | 28 |
| Capacitor impedance (ohms) | 12.0 | 11.5 | 11.6 |
| Auxiliary winding voltage | 48 | 82 | 82 |
| Auxiliary winding impedance (ohms) | 3.09 | 36.44 | 34.16 |

Referring now to Fig. 2, there is illustrated the circuit arrangement adapting the motor 10 and the starting and running circuit therefor for high voltage operation from a 230-volt single-phase A. C. source. More particularly the main winding sections 12 and 13 are connected in series relation with each other; and likewise the primary winding sections 19 and 20 are connected in series relation with each other; whereby the primary circuit includes in series circuit relation the four elements 12, 13, 19 and 20, the secondary circuit being the same as that previously described. Preferably the frame of the motor 10 comprises suitable main winding terminals 23 and primary winding terminals 24 respectively accommodating ready connection of the main winding sections 12 and 13 and the primary winding sections 19 and 20 in either parallel relationship as illustrated in Fig. 1 or in series relationship as illustrated in Fig. 2; whereby the motor 10 may be readily converted for either high voltage operation or low voltage operation by appropriate connection of straps at the terminals 23 and 24 in an obvious manner.

The general principle of operation of the motor 10 employing the high voltage connections of Fig. 2 is substantially the same as that previously described employing the low voltage connections of Fig. 1; and the following data obtained from the 1 H. P. embodiment of the motor 10 clearly illustrates the operating characteristics thereof with the high voltage connections:

Table II

| Characteristics | Starting Condition | Full Load Condition | No Load Condition |
| --- | --- | --- | --- |
| Line or primary circuit voltage | 230 | 230 | 230 |
| Line or primary circuit current (amps) | 19.0 | 6.0 | 3.5 |
| Primary winding voltage | 66 | 28 | 36 |
| Primary winding impedance (ohms) | 3.47 | 4.66 | 10.28 |
| Main winding voltage | 170 | 224 | 232 |
| Main winding impedance (ohms) | 8.94 | 37.33 | 66.28 |
| Secondary circuit current (amps) | 15.50 | 2.25 | 2.40 |
| Secondary winding voltage | 156 | 68 | 92 |
| Secondary winding impedance (ohms) | 10.06 | 30.22 | 38.33 |
| Capacitor voltage | 186 | 26 | 28 |
| Capacitor impedance (ohms) | 12.0 | 11.5 | 11.6 |
| Auxiliary winding voltage | 48 | 82 | 82 |
| Auxiliary winding impedance (ohms) | 3.09 | 36.44 | 34.16 |

From a comparison of the data of Table I, (the low voltage connections of the motor 10) with that of Table II (the high voltage connections of the motor 10) it will be appreciated that the characteristics of the secondary circuit, including the auxiliary winding 14, the secondary winding 21 and the capacitor 22 are identical, since the ampere-turns of the primary winding 19—20 are the same in the starting and running conditions of the motor 10 regardless of the low voltage or high voltage connections thereof; whereby it is unnecessaray to alter the impedance of any one of the elements included in the secondary circuit incident to conversion of the motor 10 from low voltage operation to high voltage operation or conversely.

From an examination of the data of Tables I and II, it will be observed that at motor start condition the secondary circuit is tuned to near series resonance so that a maximum current flows therein, whereby the sum of the impedances of the secondary winding 21 and the auxiliary winding 14 are nearly equal to the impedance of the capacitor 22 so that the resultant reactive components will be substantially zero in their effect upon the primary winding 19. Accordingly the tuned secondary circuit will provide substantial dephasing of the current traversing the secondary circuit with respect to the current traversing the primary circuit. Furthermore, at motor start condition, the impedance of the secondary winding 21 is greater than that of the auxiliary winding 14; at motor full-load run condition, the impedance of the secondary winding 21 is smaller than that of the auxiliary winding 14; and at motor no-load run condition the impedance of the secondary winding 21 may be equal to or greater than that of the auxiliary winding 14. These impedance relationships in the secondary circuit are very advantageous since they provide, at motor start condition, the voltage build-up of the capacitor 22 to its full voltage rating, and reduce, at motor run condition, the voltage across the capacitor 22 to a low safe value. Finally, the impedance of the capacitor 22 is maintained nearly constant and the power factor of the capacitor 22 is maintained at a very low or negligible value throughout the range of operation of the motor 10.

Referring now to Fig. 3, the preferred form of the transformer 17 is illustrated as comprising a magnetic core 18 including a substantially E-shaped core member 25 and a cooperating armature 26, the armature 26 being spaced from the ends of the legs of the core member 25 by an air gap of approximately 0.005" in order to obtain the previously mentioned desired saturable core characteristics. More specifically, the center leg of the magnetic core member 25 carries the primary winding sections 19 and 20, as well as the secondary winding 21, whereby the center leg of the magnetic core member 25 is respectively saturated and unsaturated during starting and running of the motor 10, in the manner previously explained.

Referring now to Fig. 4, there is illustrated a switching arrangement including a manually operable switch 27 having a low voltage position (to the left) and a high voltage position (to the right) and operative into its respective low voltage and high voltage positions to establish the required circuit changes in the starting and running circuit for the motor 10 in the respective low voltage and high voltage operations thereof. More particularly, the manually operable switch 27 comprises two movable blades 28 and 29 provided with associated pairs of stationary blades for respectively controlling the connection of the main winding sections 12 and 13 in parallel and series relation, as previously explained, as well as two movable blades 30 and 31 provided with associated pairs of stationary blades for respectively controlling the connection of the primary winding sections 19 and 20 in parallel and series relation, as previously explained. Of course, the manually operable switch 27 moves simultaneously the four blades 28, 29, 30 and 31, whereby the operations thereof into its respective low voltage and high voltage positions effects simultaneously changes in the connections of the main winding sections 19 and 20.

Reconsidering the connection and arrangement of the motor 10, the transformer 17 and the capacitor 22, substantially the following mathematical relationships should be maintained in order to obtain the desired operating characteristic of the motor 10, as previously described:

(1) $\quad X_c = kX_p + X_a = X_s + X_a$ (2) $\quad X_c = X_c' = X_c''$ (3) $\quad (100\% \pm 25\%)k = \dfrac{R_a}{R_m} = \dfrac{X_a}{X_m} = \dfrac{X_a''}{X_m''}$ also:

$$X_s > X_a$$
$$X_s' < X_a'$$
$$X_s'' \geqq X_a''$$

where:

$k =$ transformation factor $=$ $$\left[\dfrac{\text{number of turns of secondary winding 21}}{\text{number of turns of primary winding 19-20}}\right]^2$$

$X_c =$ capacitive reactance of the capacitor 22 at start condition.
$X_c' =$ capacitive reactance of the capacitor 22 at full-load run condition.
$X_c'' =$ capacitive reactance of the capacitor 22 at no-load run condition.
$X_p =$ inductive reactance of the primary winding 19—20 at start condition.
$X_a =$ inductive reactance of the auxiliary winding 14 at start condition.
$X_a' =$ inductive reactance of the auxiliary winding 14 at full-load run condition.
$X_a'' =$ inductive reactance of the auxiliary winding 14 at no-load run condition.
$X_s =$ inductive reactance of the secondary winding 21 at start condition.
$X_s' =$ inductive reactance of the secondary winding 21 at full-load run condition.
$X_s'' =$ inductive reactance of the secondary winding 21 at no-load run condition.
$X_m =$ inductive reactance of the main winding 12—13 at start condition.
$X_m'' =$ inductive reactance of the main winding 12—13 at no-load run condition.
$R_a =$ resistance of the auxiliary winding 14.
$R_m =$ resistance of the main winding 12—13.

In Equation 3 the $\pm 25\%$ factor accounts for different speeds and other design characteristics of the motor 10, as previously described.

When these mathematical circuit relationships are maintained in the motor 10, it is apparent that the inductive reactance of the primary winding 19—20 ($X_p$) is low when the magnetic core 18 is saturated, and is high when the magnetic core 18 is unsaturated, so that as the starting current traversing the primary winding 19—20 is reduced as the rotor 15 is accelerated toward the normal running speed, there is a gradual increase in the inductive reactance of the primary winding 19—20 after the rotor 15 reaches about 50% of its normal running speed; whereby the ratio between the inductive reactances of the primary winding 19—20 respectively at start and running conditions is appropriately varied as saturation of the magnetic core 18 subsides. This desired and controlled saturation characteristic of the magnetic core 18 is obtained both by the amount of magnetic metal included therein and by the provision of the air gap as previously explained in conjunction with Fig. 3. Moreover the provision of the step-up relationship in the transformer 17 gives a value of $k$ greater than 1, thereby rendering it practical to provide the capacitor 22 of relatively small capacitance, as is apparent from the Equation 1 above, which is advantageous in the interest of economy. Finally, it is noted that in the constructional arrangement of the embodiment of the motor 10, it is feasible to mount both the transformer 17 and the capacitor 22 on the main frame of the motor 10, thereby eliminating the necessity for separate and independently supporting bases and lending greater compactness to the motor 10 and the starting and running circuit therefor.

In view of the foregoing, it is apparent that there has been provided a dual voltage single phase induction motor of the capacitor type, and a starting and running circuit therefor of improved connection and arrangement, that develops a high starting torque in the motor, and that does not require removal from the circuit of the associated capacitor during running of the motor; whereby the motor is peculiarily adapted for use in installations where sparking therein might prove to be hazardous, i. e. installations in atmospheres containing combustible or explosives or powdered materials.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, an induction motor including a stator provided with angularly displaced main and auxiliary windings and a rotor provided with a squirrel-cage winding, a transformer including a saturable magnetic core provided with primary and secondary windings, a capacitor, a primary circuit connecting said main and primary windings in series relation with each other, and a secondary circuit connecting said auxiliary and secondary windings and said capacitor in series relation with each other, said primary circuit being connectible to a source of single phase alternating current supply having a substantially sinusoidal wave form to effect starting and running of said rotor, the starting and running impedances of said main winding being respectively low and high with respect to each other, said magnetic core being so constructed and arranged that it is respectively saturated and unsaturated by the starting and running currents traversing said primary winding in order that the starting and running currents traversing said primary winding respectively induce peaked starting and substantially sinusoidal running voltages in said secondary winding, the starting and running voltages induced in said secondary winding being respectively high and low with respect to each other and the starting and running impedances of said auxiliary winding being respectively low and high with respect to each other so that the starting and running currents traversing said auxiliary winding are respectively high and low with respect to each other, said starting current traversing said primary winding maintaining saturated said magnetic core from stand-still to at least 50% of the normal running speed of said rotor, the inductive reactance of said secondary winding being respectively low and high with respect to each other when said magnetic core is respectively saturated and unsaturated, and the inductive reactance of said secondary winding when it is respectively low and high being so proportioned and related with respect to the inductive reactance of said auxiliary winding and to the capacitive reactance of said capacitor that said secondary circuit is respectively substantially at and well removed from series resonance, whereby said capacitor effects substantial dephasing of the starting current traversing said auxiliary winding with respect to the starting current traversing said main winding in order to produce a substantial starting torque between said stator and said rotor.

2. The combination set forth in claim 1, wherein the number of turns of said secondary winding is greater than the number of turns of said primary winding so that the transformation factor $k$ is greater than 1; where $$k = \left[\frac{\text{No. turns of said secondary winding}}{\text{No. turns of said primary winding}}\right]^2$$

3. The combination set forth in claim 2; wherein:

$$X_c = kX_p + X_a;\ =X_s + X_a$$

where:

$X_c$=capacitive reactance of said capacitor
$X_p$=inductive reactance of said primary winding at start condition
$X_a$=inductive reactance of said auxiliary winding at start condition, and
$X_s$=inductive reactance of said secondary winding at start condition 4. The combination set forth in claim 2; wherein:

$$(100\% \pm 25\%)k = R_a/R_m = X_a/X_m = X_a''/X_m''$$

where:

$R_a$=resistance of said auxiliary winding
$R_m$=resistance of said main winding
$X_a$=inductive reactance of said auxiliary winding at start condition.
$X_m$=inductive reactance of said main winding at start condition
$X_a''$=inductive reactance of said auxiliary winding at no-load run condition, and
$X_m''$=inductive reactance of said main winding at no-load run condition 5. The combination set forth in claim 1; wherein:

$$X_s > X_a$$
$$X_s' < X_a'$$

and $$X_s'' \geq X_a''$$

where:

$X_s$=inductive reactance of said secondary winding at start condition
$X_s'$=inductive reactance of said secondary winding at full-load run condition
$X_s''$=inductive reactance of said secondary winding at no-load run condition
$X_a$=inductive reactance of said auxiliary winding at start condition
$X_a'$=inductive reactance of said auxiliary winding at full-load run condition, and
$X_a''$=inductive reactance of said auxiliary winding at no-load run condition 6. The combination set forth in claim 1, wherein the starting and running voltages impressed across said capacitor are respectively substantially at and considerably below the rated voltage of said capacitor.

7. The combination set forth in claim 1, wherein the starting and running impedances of said main winding are higher than the respective starting and running impedances of said primary winding.

8. The combination set forth in claim 1, wherein the starting and running impedances of said main winding are lower than the respective starting and running impedances of said auxiliary winding.

9. The combination set forth in claim 1, wherein the starting and running impedances of said main winding are higher than the respective starting and running impedances of said auxiliary winding.

10. The combination set forth in claim 1, wherein said magnetic core has an air gap therein to effect saturation thereof at start condition.

11. The combination set forth in claim 1, wherein said capacitor is of the dry electrolytic type.

12. In combination, an induction motor including a stator provided with angularly displaced main and auxiliary windings and a rotor provided with a squirrel-cage winding, a transformer including a saturable magnetic core provided with primary and secondary windings, a capacitor, a primary circuit connecting said main and primary windings in series relation with each other, and a secondary circuit connecting said auxiliary and secondary windings and said capacitor in series relation with each other, said primary circuit being connectible to a source of single-phase alternating current supply having a substantially sinusoidal wave form to effect starting and running of said rotor, the starting and running impedances of said main winding being respectively low and high with respect to each other so that said magnetic core is respectively saturated and unsaturated by the starting and running currents traversing said primary winding, the starting and running currents traversing said primary winding respectively inducing peaked starting and substantially sinusoidal running voltages in said secondary winding, the starting and running voltages induced in said secondary winding being respectively high and low with respect to each other and the starting and running impedances of said auxiliary winding being respectively low and high with respect to each other so that the starting and running currents traversing said auxiliary winding are respectively high and low with respect to each other, said starting current traversing said primary winding maintaining saturated said magnetic core from standstill to at least 50% of the normal running speed of said rotor, said secondary circuit being substantially series resonant during saturation of said magnetic core so that said capacitor effects substantial dephasing of the starting current traversing said auxiliary winding with respect to the starting current traversing said main winding in order to produce a substantial starting torque between said stator and said rotor, wherein said primary winding includes two sections accommodating either parallel or series inclusion thereof with respect to each other in said primary circuit, and said main winding includes two sections accommodating either parallel or series inclusion thereof with respect to each other in said primary circuit, whereby said induction motor may be readily adapted for respective low and high voltage of said source of supply, the ampere-turns of said secondary winding being substantially constant when said source of supply is either of low voltage or of high voltage.

13. The combination set forth in claim 12, and further comprising switching means having a low voltage position including said primary winding sections in parallel relation with each other and including said main winding sections in parallel relation with each other in said primary circuit and having a high voltage position including said primary winding sections in series relation with each other and including said main winding sections in series relation with each other in said primary circuit.

References Cited in the file of this patent

UNITED STATES PATENTS

| | | |
|---|---|---|
| 1,844,093 | Kennedy | Feb. 9, 1932 |
| 2,619,621 | Brown | Nov. 25, 1952 |
| 2,646,537 | Lewus | July 21, 1953 |